United States Patent
vonThenen et al.

(10) Patent No.: US 10,445,186 B1
(45) Date of Patent: Oct. 15, 2019

(54) ASSOCIATING A GUEST APPLICATION WITHIN A VIRTUAL MACHINE TO CREATE DEPENDENCIES IN BACKUP/RESTORE POLICY

(71) Applicant: EMC Corporation, Hopkinton, MA (US)

(72) Inventors: David vonThenen, Irvine, CA (US); Patty Zack, Irvine, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 465 days.

(21) Appl. No.: 14/788,597

(22) Filed: Jun. 30, 2015

(51) Int. Cl.
  *G06F 17/30* (2006.01)
  *G06F 11/14* (2006.01)
  *H04L 29/08* (2006.01)
  *G06F 16/11* (2019.01)

(52) U.S. Cl.
  CPC ......... *G06F 11/1451* (2013.01); *H04L 67/10* (2013.01); *G06F 11/1461* (2013.01); *G06F 11/1464* (2013.01); *G06F 11/1469* (2013.01); *G06F 16/122* (2019.01); *G06F 2201/815* (2013.01); *G06F 2201/84* (2013.01)

(58) Field of Classification Search
  CPC .......... G06F 11/1451; G06F 17/30233; G06F 2201/815; G06F 11/1461; G06F 11/1464; G06F 11/1469; G06F 16/12; G06F 2201/84; H04L 63/083; H04L 63/104; H04L 63/105; H04L 63/20; H04L 67/10
  See application file for complete search history.

(56) References Cited

U.S. PATENT DOCUMENTS

| | | | | |
|---|---|---|---|---|
| 8,060,476 B1 * | 11/2011 | Afonso | ............... | G06F 11/1451 707/649 |
| 9,495,142 B2 * | 11/2016 | Koushik | ................... | G06F 8/61 |
| 2012/0109958 A1 * | 5/2012 | Thakur | ................. | G06F 16/122 707/737 |
| 2015/0370652 A1 * | 12/2015 | He | ...................... | G06F 11/1451 714/19 |

* cited by examiner

*Primary Examiner* — Shew Fen Lin
(74) *Attorney, Agent, or Firm* — Womble Bond Dickinson (US) LLP

(57) ABSTRACT

Systems and methods are disclosed for performing a backup of data to a backup server for one or more applications on a virtual machine having a universally unique identifier (UUID). A backup application can be deployed within the virtual machine, residing on a guest operating system. The backup application can report a list of applications on the virtual machine to the backup server. The backup server can deploy any application-specific modules that may be needed to perform the backup, and a list of pre- and post-backup actions to take, per application. The backup server can trigger the pre- and/or post-backup actions. The virtual machine can inform the backup server that the pre- and/or post-backup actions have completed. Backups can be in accordance with one or more policies stored at the backup server and associated with the virtual machine UUID or associated with an account that the virtual machine, or its user, are associated with.

24 Claims, 9 Drawing Sheets

UUID: 03F2-7F75-149A-C38D — 500, 501

| Application Name | Version | Build | Serial/License |
|---|---|---|---|
| DB2 Server for VM | 1.1 | 2015-01-13.05F2 | IBM-0123456789ABCDEF |
| SQL Server 2014 | 2.0 | 2014-09-25.FF2A | MSFT-ABCDEF0123456789 |
| SAP ERP | 1.5 | 2013-07-26.7BC2 | SAP-01234ABCDEF789 |
| Microsoft Exchange Server 2013 | 2.4 | 2013-0.516.32 | MSFT-20121011ABCDEF |

502 — 503 — 504 — 505

510 → (DB2 Server for VM)
515 → (SQL Server 2014)
515 → (SAP ERP)
520 → (Microsoft Exchange Server 2013)

*FIG. 5*

ASSOCIATING A GUEST APPLICATION WITHIN A VIRTUAL MACHINE TO CREATE DEPENDENCIES IN BACKUP/RESTORE POLICY

TECHNICAL FIELD

This disclosure relates to the field of backing up data from a virtual machine to a backup server.

BACKGROUND

A virtual machine in a virtual computing infrastructure can run on a host device that comprises physical hardware and virtualization software. One or more applications that can run within the virtual machine can generate data that may need to be backed up to a backup server. One or more backup policies may exist on the backup server that can indicate a quality of service of the backup. Often, policies are specific to an application. Virtual machine backup applications of the prior art do not have a way to automatically discover the applications on a virtual machine from within the virtual machine. Virtual machine backup applications of the prior art also do not associate a virtual machine universally unique identifier with a backup policy with one or more of the applications from within the virtual machine. In addition, some applications may need application-specific pre-backup or post-backup actions performed. Virtual machine backup applications of the prior art also do not have a way to automatically perform application-specific pre- and/or post-backup actions on the applications from within the virtual machine.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 5 illustrates example attributes of a backup inventory, according to some embodiments.

DETAILED DESCRIPTION

Figure 1:
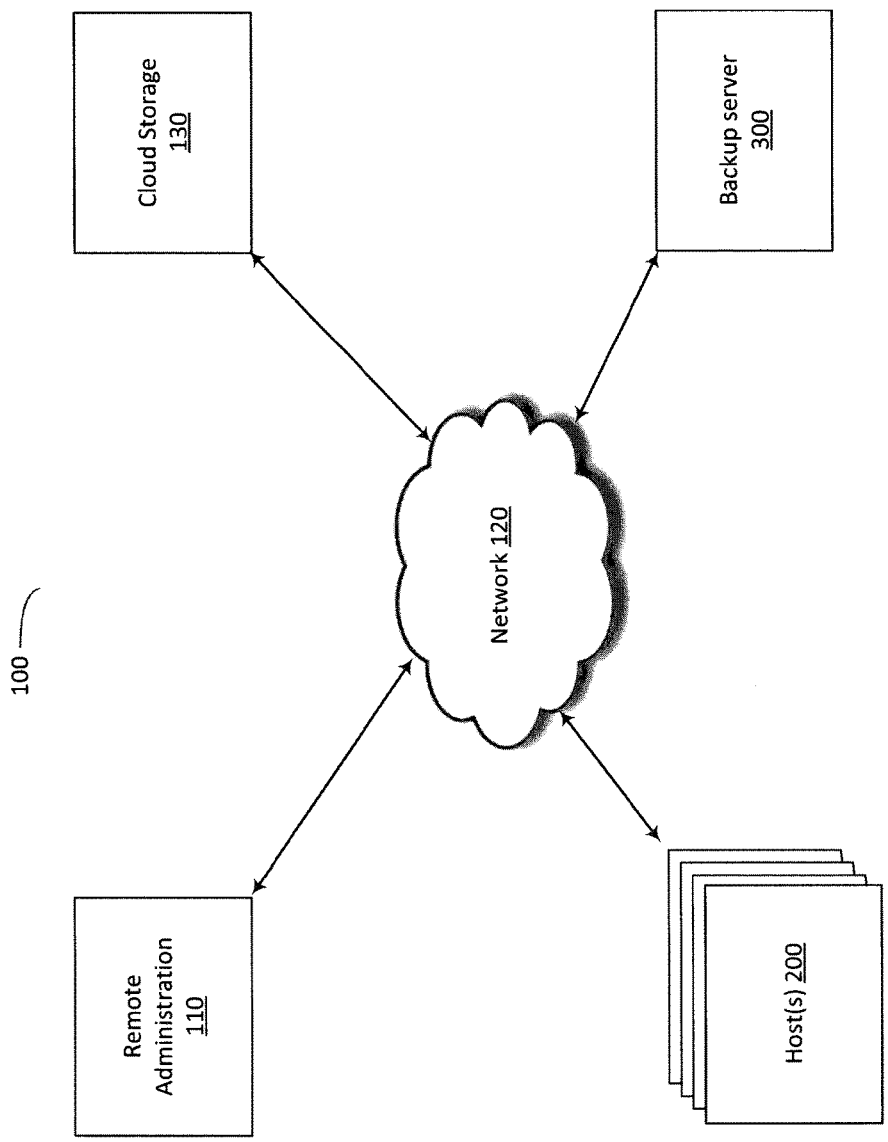
FIG. 1 illustrates, in block diagram form, a system for backing up one or more virtual machines of a virtual infrastructure in accordance with some embodiments.

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for discovering one or more applications inside a virtual machine and for automatically backing up application data associated with the one or more applications. A virtual machine can be implemented on virtualization software that contains a backup application that can communicate with one or more backup components that reside within the virtual machine on a guest operating system running with the virtual machine. The one or more backup components can include a backup agent that can aid the backup application in performing backup functions within the virtual machine. The one or more backup components can communicate to the backup application a list of one or more applications that reside on the guest operating system within the virtual machine having data that may need to be backed up. A backup server that can store backup data can have an account that is associated with one or more backup policies. The virtual machine can be associated with the account and the one or more backup policies. The backup application can implement operations that cause the backup agent, or other backup component, to build the inventory of applications that are resident on the guest operating system, and transfer the inventory to the backup server backup application. The backup server backup application can automatically associate one or more applications in the inventory with a backup policy for one or more of the applications. Then, the backup server backup application can cause the virtual machine backup application, and its backup components, to backup data in accordance with the policies.

In an embodiment, a computer-implemented method of discovering applications within a virtual machine and performing a backup of application data of one or more of the discovered applications includes transmitting an identifier, such as a universally unique identifier (UUID), of a virtual machine to a backup server. The virtual machine can receive a backup application (or "agent") from the server. The backup agent can discover the applications on the virtual machine, from within the virtual machine, and transmit a list of one or more applications on the virtual machine to the backup server. The virtual machine can receive one or more application-specific actions for at least one application on the virtual machine and can automatically perform the application-specific actions and a backup of the at least one application on the virtual machine.

The application-specific actions can include at least one of a pre-backup action or a post-backup action. The method can further include automatically performing an application-specific pre-backup action before performing the backup of the at least one application, in response to receiving the pre-backup action. The method can further include automatically performing an application-specific post-backup action after performing the backup of the at least one application, in response to receiving the post-backup action. The method can also include receiving an application-specific backup module for the at least one application. The backup can be an incremental backup, a full backup or an image backup of the application data. The backup can also include backing up at least one application.

The backup agent can transmit confirmation of performance of the application-specific pre-backup action, in response to performing the pre-backup action. The backup agent can also transmit confirmation of performance of the application-specific post-backup action, in response to performing the post-backup action. The backup of the virtual machine can be initiated by a user of a the virtual machine, by an administrator using a remote administration module, or automatically by the backup server in accordance with a policy. The method can be embodied on a non-transitory computer-readable medium programmed with executable instructions that, when executed, perform the method. A system can be programmed with executable instructions that, when executed by a processing system, can perform the method.

In another embodiment, a method of a backup server backing up a virtual machine can include the backup server receiving a virtual machine identifier, such as a virtual machine UUID, from a virtual machine. The backup server can use the UUID of the virtual machine to look up an account on the backup server, the account being associated with the virtual machine UUID. The backup server can transmit an update of a backup application on the virtual machine. The backup server can also transmit a full version of a backup application to the virtual machine for installation of the backup application on the virtual machine. The backup server can register the virtual machine and virtual machine UUID in response to a request form the virtual machine to register the virtual machine and UUID with the backup server.

The method can further include the backup server receiving a list of applications from the virtual machine that are on the virtual machine. The method also can include the backup server looking up a backup policy for an account associated with the virtual machine and UUID. The backup server can transmit application-specific modules and/or a list of application-specific pre-backup and/or post-backup actions that may be needed to perform a backup of an application that is on the virtual machine. The backup server can receive backup data for one or more applications from the virtual machine backup application. The method can also include the backup server automatically triggering one or more application-specific post-backup actions on the virtual machine. In an embodiment, the virtual machine backup application can automatically trigger the performance of the pre-backup and/or post-backup application specific actions on the virtual machine. In an embodiment, the backup server can receive confirmation from the virtual machine that the backup has completed.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

FIG. 1 illustrates, in block diagram form, a virtual infrastructure 100 for backing up data from one or more applications on a virtual machine on a host computing system 200 to a backup server 300 in accordance with some embodiments.

A virtual infrastructure 100 can include one or more host devices 200 (or "client devices") coupled to a network 120 and a backup server 300 coupled to the network 120. A remote administration module 110 can also be coupled to one or more hosts 200 and the backup server 300 via network 120. Hosts 200, backup server 300, and remote administration module 110 can also be coupled to a one or more cloud storage services 130. Host(s) 200 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of host(s) 200 may be a primary storage system (e.g., local data center) that provides storage to other local clients, which may periodically back up the content stored therein to a backup storage system (e.g., a disaster recovery site or system), such as storage system 300. Network 120 may be any type of networks such as a local area network (LAN), a wide area network (WAN) such as the Internet, a fiber network, a storage network, or a combination thereof, wired or wireless.

A host 200 can backup one or more applications in a virtual machine on the host 200 to the backup server 300. Backup server 300 can, in turn, opt to store all or a portion of the backup data of the one or more applications to cloud storage 130.

A backup of an application on a virtual machine on host 200 can be initiated by a user of the virtual machine on host 200. In an embodiment, a remote administrator 110 can initiate a backup of data of an application on a virtual machine on host 200. In an embodiment, backup server 300 can initiate a backup of data of an application on a virtual machine on host. Backup server 300 can initiate a backup an application on a virtual machine on host 200 in accordance with one or more backup policies associated with host 200 or with a virtual machine on host 200. In an embodiment, a backup policy can be application-specific. For example, a policy for a virtual machine on host 200 can be that a full backup of DB2 data is performed every Friday evening.

Figure 2:
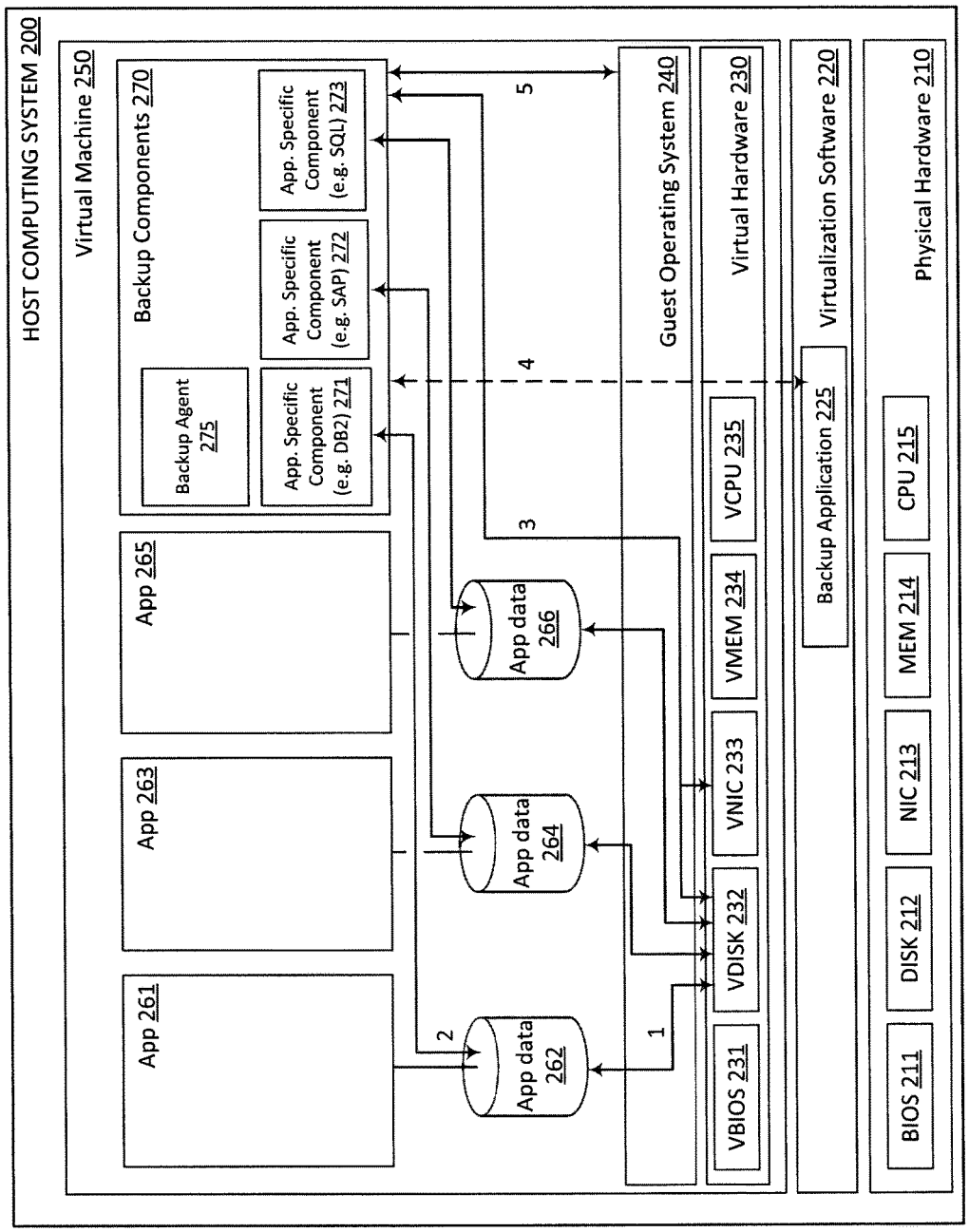
FIG. 2 illustrates, in block diagram form, an exemplary host computing system having one or virtual machines to be backed up, in accordance with some embodiments.

FIG. 2 illustrates, in block diagram form, a virtual machine 250 on a host computing system (or "client device") 200 having backup functionality, according to some embodiments.

Client device 200 hardware 210 can include a physical basic input-output system (BIOS) 211, one or more physical disks or storage objects 212, one or more network interface cards (NIC) 213, memory 215, and one or more processors or CPUs 215. Client device 200 can be implemented in accordance with the computing system described with reference to FIG. 9, below.

Client device 200 can include virtualization software 220 and can further include virtual hardware 230 that can correspond to physical hardware 210, such as a virtual BIOS 231, one or more virtual storage devices (VDISK) 232, one or more virtual network interface cards (VNIC) 233, virtual memory 234, and one or more virtual processors 235. Client device 200 can also include one or more guest operating systems 240. In an embodiment, a virtual BIOS 231 identifier can provide a globally unique identifier (UUID) for virtual machine 250 for purposes of performing backup functionality described herein. In an embodiment, a virtual machine 250 UUID can be persistent with a particular virtual machine 250, even if the virtual machine 250 is moved to a different client device 200.

Virtualization software 220 can include backup application 225. In an embodiment, backup application 225 can communicate with backup server backup application 310 via network 120. Backup application 225 can perform an image backup of an entire virtual machine 250. In an embodiment, backup application 225 can communicate with one or more backup components 270, including backup agent 275 and application-specific components 271, 272, and 273. Backup application 225 can communicate with backup components 270 via interprocess communication, such as messaging, shared memory, sockets, or other communication methods.

Continuing with the description of client device 200, client device 200 can include one or more virtual machines 250, each of which can have applications 261, 263, 265, and corresponding application data 262, 264, and 266, respectively. Backup components 270 can include a backup agent 275 that can communicate via communication channel 4 with backup application 225. Backup agent 275 can also communicate via communication channel 5 with guest operating system 240. Backup agent 275 can give backup application 225 a view of the inside of a virtual machine 250 to obtain information such as the virtual machine BIOS identifier, a virtual machine universally unique identifier (UUID), and a list of applications that are installed on the guest operating system 240. Backup agent 275 can communicate this information to backup application 225 which, in turn, can pass the information to backup application 310 on the backup server 300. Backup components 270 can also include application-specific components 271, 272, and 273, e.g. for backing up DB2, SAP, and SQL data, respectively, and for performing other application-specific backup functions. Application-specific backup functions can include providing application-specific backup data formatting (e.g. backup by data block or backup by file), application-specific pre-backup and/or post-backup actions, and logging, cleanup, and other backup actions that may be specific to a particular application.

Backup components 270 can be provided with virtual machine 250 at the time that virtual machine 250 is generated on client device 200. In an embodiment, one or more backup components 270 can be downloaded from backup server 300 prior to performing a backup of virtual machine 250. In an embodiment, application-specific modules, e.g. 271-273, can be downloaded from backup server 300 prior to, or during, performing a backup of application data of one or more applications on virtual machine 250. In an embodiment, application-specific modules, e.g. 271-273 can be downloaded to virtual machine 250 in response to virtual machine 250 transmitting to backup server 300 a list of applications that are on virtual machine 250 and available for backup. Additional application-specific and/or function-specific modules can be added to backup components 270.

Example applications 261, 263 and 265 can generate, and interact with, application data 262, 264, and 266 respectively. Backup components 270 application-specific components 271-273 can interact with respective application data 262, 264, 266 to backup and write files to virtual disk 232 via communication channels 1 and 2. Backup components 270, and application-specific components e.g. 271-273, can write files to virtual network interface card (vNIC) 233 via communication channel 3 for transmitting over hardware network interface card (NIC) 213 to network 120, and on to backup server 300 over network 120.

In one embodiment, host 200 further includes a storage manager or storage controller (not shown) configured to manage storage resources of host 200, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Figure 3:
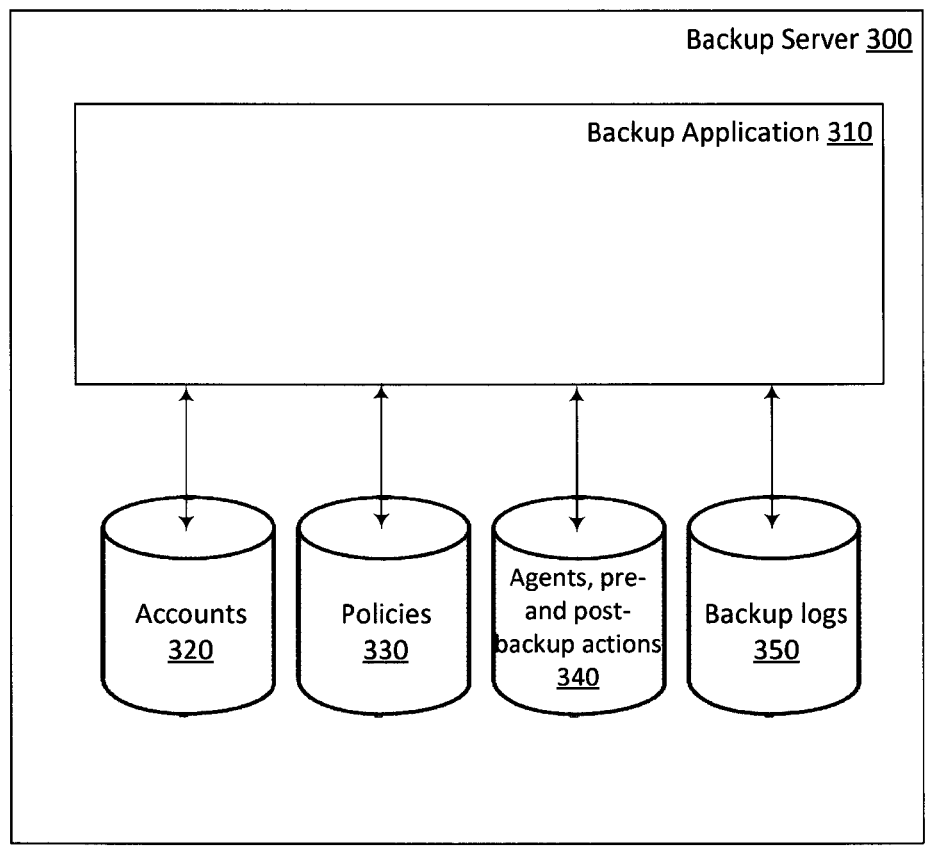
FIG. 3 illustrates, in block diagram form, a backup server in a virtual infrastructure, in accordance with some embodiments.

FIG. 3 illustrates, in block diagram form, a backup server 300 in a virtual infrastructure, in accordance with some embodiments. Backup server 300 can be a computing system as described with reference to FIG. 9, below. Backup server 300 can comprise one or more computing systems.

A backup server 300 can include a backup application 310 that interacts with a virtual machine 250 during a backup of data of one or more applications on virtual machine 250. Backup application 310 can read and write backup accounts 320, backup policies 330, backup agents 340, and backup logs 350. Accounts 320, policies 330, agents 340, and logs 350 can reside on a single storage device accessible to backup server 300, or across multiple storage devices accessible to backup server 300.

Backup accounts 320 can include login information to backup server 300 for users of virtual machines 250 and administrators who may access backup server 300 via remote administration module 110. Accounts 320 can be aggregated by company, by region, or other metric, such that backup policies 330 can be generated for one or more backup accounts 320 by company, by region, or other metric, such as by data center or business operating group.

Backup policies 330 can specify the particular applications whose data gets backed up from one or more virtual machines 250, retention policy for the backed up data, whether the backups are incremental, full, image, or an alternating or interleaved combination of these. Backup policies 330 can further define whether data is deduplicated before storage, how quickly the storage can be retrieved for access by a virtual machine, and other policy parameters.

Backup agents 340 include modules that can perform general backup functions and can additionally include modules that can perform application specific functionality such as application-specific components 271-273 with reference to FIG. 2 above. Application-specific modules can be requested by, and downloaded to, a virtual machine 250 as a part of a backup process. Backup application 310 can determine which application-specific components a virtual machine may need to perform a backup by receiving an inventory (or "manifest") of applications from the virtual machine 250 to be backed.

Backup logs 350 can be generated at backup time to indicate the data that was backed up from a particular virtual machine 250. In addition, backup logs 350 can be updated if a status, location, or other relevant fact about a backup changes. For example, a policy 330 for a particular account may indicate that backups of all virtual machines for the account are to be retained for 30 days and, after the next backup, previous backups are to be moved to a lower tier storage such as tape. A policy may further indicate that after backups are 120 days old that the backups are to be erased. The backup logs 350 indicating the status of historic backups can be retained for an extended period of time. A policy 330 can determine how long backup logs 350 are retained.

Backup server 300 operating as a storage system may include or represent any type of servers or a cluster of one or more servers (e.g., cloud servers). For example, storage system 300 may be a storage server used for various different purposes, such as to provide multiple users or client systems with access to shared data and/or to back up (or restore) data (e.g., mission critical data). Storage system 300 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 300 includes, but is not limited to, storage service engine, optional deduplication logic, and one or more storage units or devices communicatively coupled to each other (not shown). The storage service engine may represent any storage service related components configured or adapted to provide storage services (e.g., storage as a service) to a variety of clients using any of the access protocols set forth above. For example, the storage service engine may include or be coupled to backup application 310. Backup application 310 is configured to receive and back up data from a client (e.g., hosts 200) and to store the backup data in any one or more of the storage units. The backup application 310 may further include restoration functionality configured to retrieve and restore backup data from any one or more of the storage units back to a client (e.g., hosts 200).

The storage units may be implemented locally (e.g., single node operating environment) or remotely (e.g., multi-node operating environment) via interconnect, which may be a bus and/or a network (e.g., a storage network or a network similar to network). The storage units may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system.

In response to a data file to be stored in the storage units, according to one embodiment, deduplication logic (not shown) is configured to segment the data file into multiple segments (also referred to as chunks) according to a variety of segmentation policies or rules. The deduplication logic may choose not to store a segment in a storage unit if the segment has been previously stored in the storage unit. In the event that the deduplication logic chooses not to store the segment in the storage unit, it stores metadata enabling the reconstruction of the file using the previously stored segment. As a result, segments of data files are stored in a deduplicated manner, either within each of the storage units or across at least some of the storage units. The metadata, such as metadata, may be stored in at least some of the storage units, such that files can be accessed independent of another storage unit. Metadata of each storage unit includes enough information to provide access to the files it contains.

Figure 4:
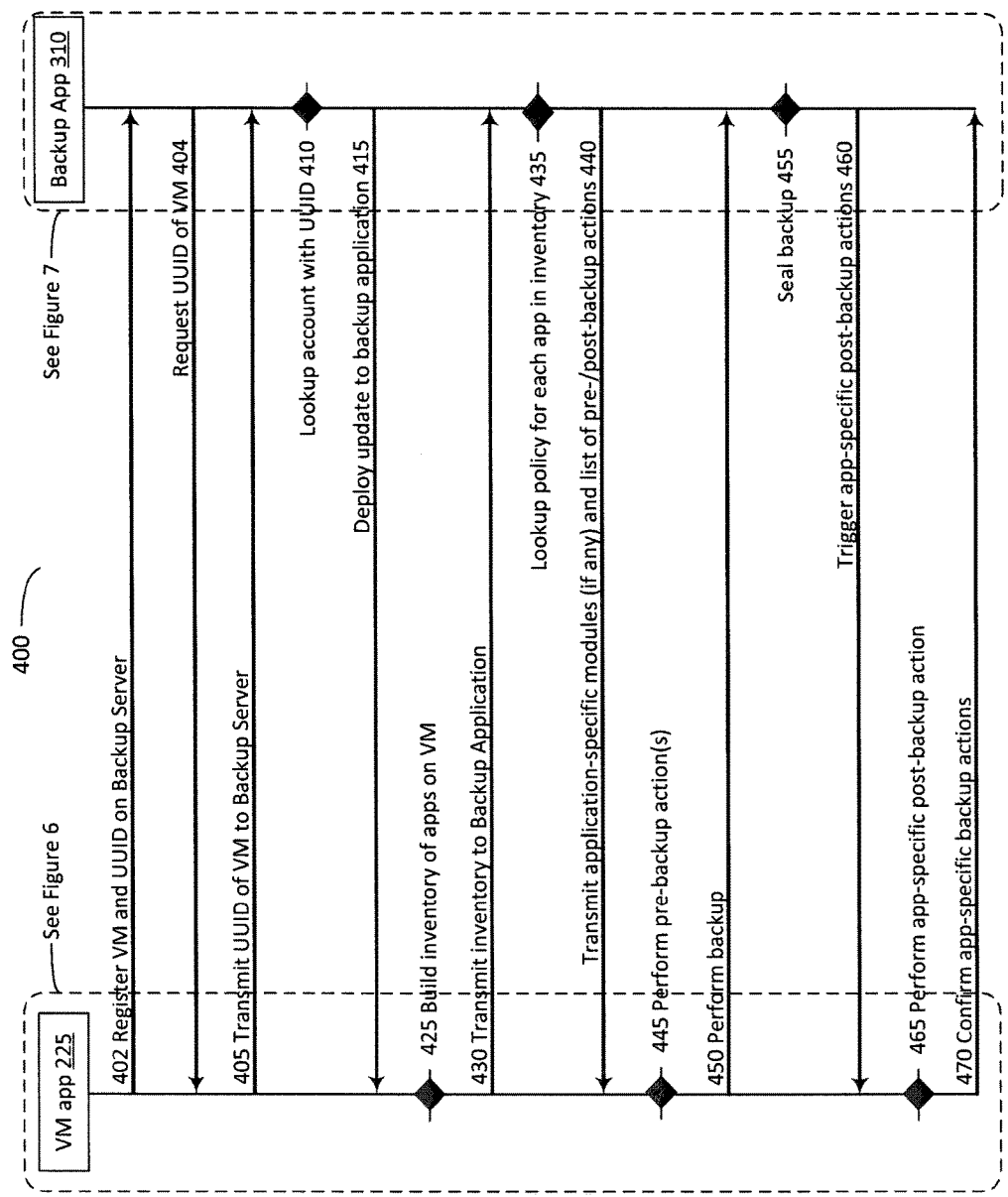
FIG. 4 illustrates a communication exchange between a virtual machine to be backed up and a backup server in accordance with some embodiments.

FIG. 4 illustrates a communication exchange 400 between a virtual machine 250 to be backed up and a backup server 300 in accordance with some embodiments. See FIG. 6 for a flow diagram of a virtual machine-side method 600 of backing up a virtual machine 250. See FIG. 7 for a flow diagram of a server-side method 700 of backing up a virtual machine 250.

In operation 402, a virtual machine 250 can register itself, along with a universally unique identifier (UUID) of the virtual machine 250, with backup server 300. In an embodiment, the registration operation 402 need only be performed once before a first backup. Subsequent backups may not require registration of the virtual machine and UUID with the backup server 300. Backup server 300 can use the UUID of the virtual machine 250 as a key to automatically lookup an account 320 that the virtual machine 250 or UUID may be associated with. Registration 402 of the virtual machine 250 and UUID with the backup server 300 can facilitate future interaction between the virtual machine 250 and backup server 300. Registration can indicate to the backup server 300 that this particular virtual machine 250 has performed a backup using backup server 300 at least once, and therefore backup-related information, such as the virtual machine UUID, account 320, and associated backup policies 330, should be accessible to the backup server 300 and virtual machine 250. The backup server 300 can further use the virtual machine UUID or information in the account 320 to lookup one or more policies 330 that govern which application data is to be backed up, the media type to backup the data upon, the duration of retention of the data, or other quality of service metric. The backup server 300 and backup application 310 can further determine, for application data that is to be backed up, any pre-backup or post-backup actions that may need to be taken by the backup application 225, the backup agent 275, or any of the application-specific components, 3.g. 271, 272, or 273.

In operation 404, the backup application 310 can request the UUID of the virtual machine 250 whose data will be backed up.

In operation 405, a virtual machine 250 can transmit the UUID to backup server 300 to uniquely identify the virtual machine 250 to the backup application 310. In an embodiment, virtual machine 250 can also transmit version information of backup application 225 or of one or more backup components 270 currently on virtual machine 250 to backup server application 310. Backup server application 310 can use this version information to determine whether to deploy an update of the backup application 225 or an application component 270 to the virtual machine 250 before proceeding with the backup.

In operation 410, backup server application 310 can look up the virtual machine 250 in the accounts 320 and policies 330 to determine further actions to perform during the backup. For example, an account 320 may have a policy 330 that a backup for Microsoft® Exchange Server data is to be deduplicated before storage and is to be retained for a predetermined period of time such as 90 days.

In operation 415, backup server application 310 can optionally deploy an update to one or more backup components 270 to the virtual machine 250, based upon the version information received from the virtual machine in operation 405.

In operation 425, virtual machine backup application 225 can build an inventory of applications that are on virtual machine 250. In an embodiment, backup application 225 can communicate with one or more backup components 270, such as backup agent 275, to determine the inventory of applications residing on guest operation system 240 within virtual machine 250. In an embodiment, the inventory 425 can include all applications on the guest operating system 240 within the virtual machine 250. In an embodiment, backup application 225 can have a select list of applications whose data is intended to be backed up, and therefore limit the inventory 425 to at most the select list of applications. In an embodiment, a policy 330 associated with an account 320 can determine a list of applications whose data is eligible for backup, in the inventory 425.

In operation 430, virtual machine backup application 225 can transmit the inventory to the backup server backup application 310.

In operation 435, the backup server backup application 310 can look up a policy 330 for each application in the inventory. In an embodiment, backup server backup application 310 can trim the inventory list based on whether a policy 330 exists for this virtual machine (e.g. by virtual of being associated with an account 320) or whether the application's data should be ignored (i.e., not backed up). Once a list of applications whose data should be backed up is determined by the backup server backup application 310, backup server backup application 310 can also automatically look up any application-specific modules and pre- or post-backup actions that may be associated with an application whose data is to be backed up.

In operation 440, backup server backup application 310 can transmit to the virtual machine backup application 225 any application specific modules or agents 340 and any pre- or post-backup actions that are associated with an application whose data is be backed up.

In operation 445, virtual machine backup application 225 can perform any pre-backup actions or by application-specific pre-backup actions. Pre-backup actions may include ensuring that the application is terminated, or in the background, and ensuring that the data file to be backed up is at least temporarily write-locked so that the data being backed up cannot change during the backup.

In operation 450, virtual machine backup application 225 can perform a backup of data for one or more applications. In an embodiment, the backup can be an incremental backup. In an embodiment, the backup can be a full backup of the application data. In an embodiment, the backup can be an image backup of the application data. To perform the backup of application data, backup application 225 may communicate with one or more backup components 270. In an embodiment, backup application 225 communicates with backup agent 275 to perform a backup of application data. In an embodiment, backup application 225 can communicate with an application-specific component, e.g. 271, 272, or 273 to perform the backup of application data.

In operation 455, backup server backup application 310 can seal the backup indicating that the data is safely backed up.

In operation 460, backup server backup application 310 can automatically trigger post-backup actions for the backup that was just sealed. A post-backup action could include truncating certain logs for the application, releasing the write lock on the application data, or booting the application, if the application was stopped to perform the backups.

In operation 465, virtual machine backup application 225 can execute the post-backup action(s) triggered by the backup server backup application 310 in operation 460.

In operation 470, the virtual machine backup application 225 can indicate to the backup server backup application 310 that the post-backup action(s) are complete and the backup process is complete.

FIG. 5 illustrates example attributes 500 of a backup inventory, according to some embodiments.

An inventory 500 of applications whose data is to be backed up from a virtual machine 250 to a backup server 300 can include an identifier, such as a universally unique identifier (UUID) 501, that uniquely identifies the virtual machine 250 within the virtual infrastructure 100.

Each entry in the inventory 500 can have an application identifier or name 502, a version of the application 503, a build of the application 504 and a serial number or license 505 for the application.

One or more applications on a virtual machine 250 can be, e.g., DB2 Server for VM (510), SQL Server 2014 (515), SAP Enterprise Resource Planning (515), or Microsoft Exchange Server 2013 (520). A virtual machine application inventory could have more, or fewer, fields than those described here.

Figure 6:
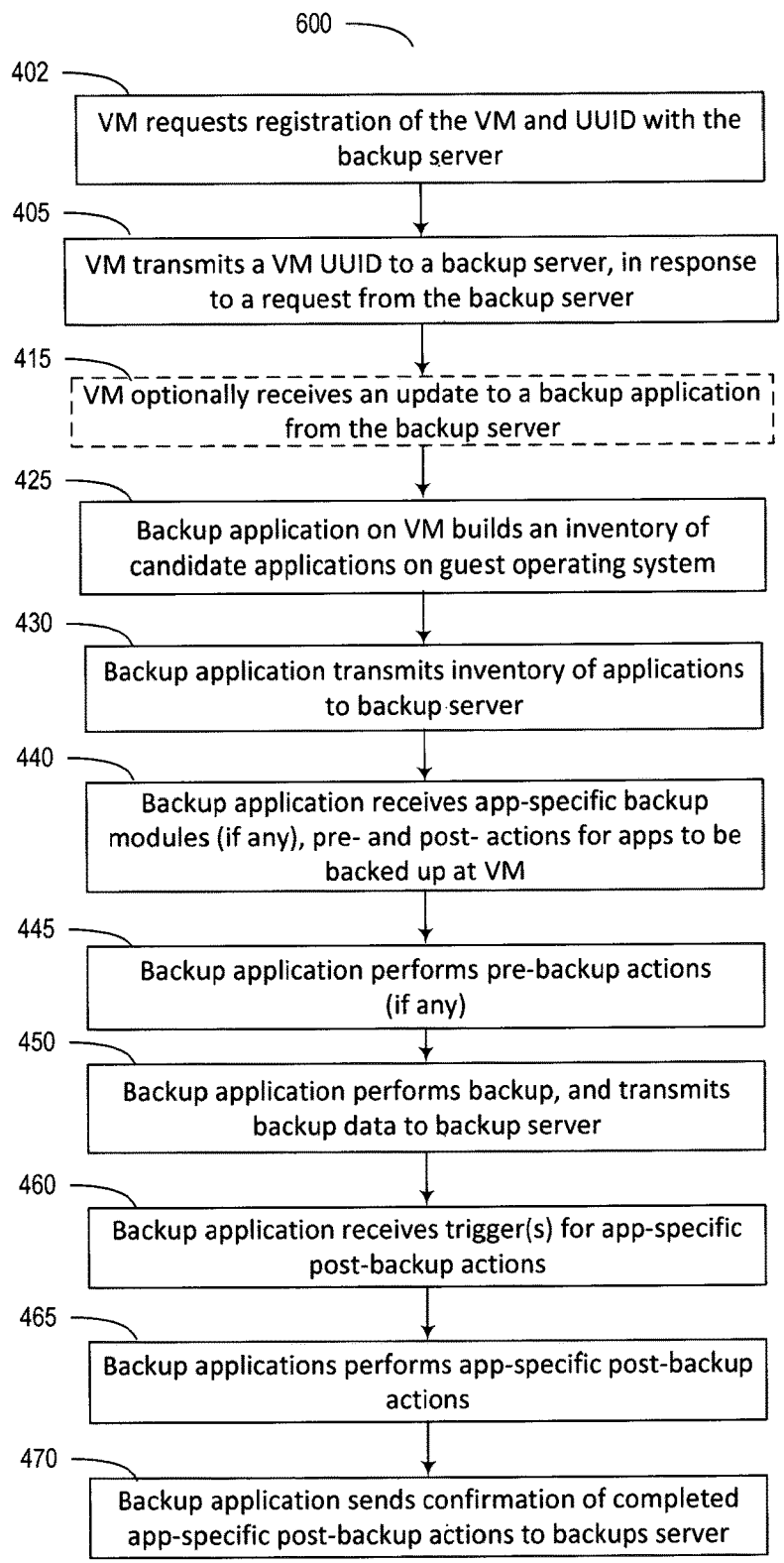
FIG. 6 illustrates a flow chart of a method of backing up a virtual machine according to some embodiments.

FIG. 6 illustrates a flow chart of a method 600 of backing up a virtual machine 250 to a backup server 300 using a backup application 225 and one or more backup application components 270 on the virtual machine 250 and a backup application 310 on the backup server 300, according to some embodiments.

In operation 402, a virtual machine 250 can request registration of the virtual machine 250 and a universally unique identifier (UUID) with the backup server 300. The backup server can use the UUID to lookup an account 320 and/or one or more backup policies 330 associated with the virtual machine 250.

In operation 405, a virtual machine 250 can transmit its UUID to backup server 300 to uniquely identify the virtual machine 250 to the backup server 300. In an embodiment, virtual machine 250 can also transmit version information of backup application 225, or version information of one or more backup application components 270, currently on virtual machine 250. Backup server backup application 310 can use this version information to determine whether to deploy an update of the backup application 225 to the virtual machine 250 before proceeding with the backup.

In operation 415, virtual machine backup application 225 can optionally receive an updated backup application 225, or one or more updated backup components 270, from the backup server application 310, based upon the version information received from the virtual machine in operation 405.

In operation 425, virtual machine backup application 225 or backup agent 275 can automatically discover the applications that are on the guest operating system 240 within the virtual machine and build an inventory of applications that are on guest operating system 240 within virtual machine 250. The inventory of applications associates the virtual machine UUID with the list applications on the guest operating system 240. In an embodiment, the inventory 425 can include all applications in the virtual machine 250. In an embodiment, backup application 225 or backup agent 275 can have a select list of applications whose data is intended to be backed up, and therefore limit the inventory 425 to at most the select list of applications. In an embodiment, a policy 330 associated with account 320 can determine a list of applications whose data is eligible for backup in the inventory 425.

In operation 430, virtual machine backup application 225 can transmit the inventory to the backup server backup application 310.

In operation 440, backup server backup application 310 can transmit to the virtual machine backup application 225 any application specific modules or agents 340 and any pre- or post-backup actions that are associated with an application whose data is to be backed up.

In operation 445, virtual machine backup application 225 can automatically perform any pre-backup actions or by application-specific pre-backup actions. Pre-backup actions may include ensuring that the application is terminated, or in the background, and ensuring that the data file to be backed up is at least temporarily write-locked so that the data being backed up cannot change during the backup.

In operation 450, virtual machine backup application 225, or application specific components 270, can perform a backup of data for one or more applications. In an embodiment, the backup can be an incremental backup. In an embodiment, the backup can be a full backup of the application data. In an embodiment, the backup can be an image backup of the application data. In another embodiment, the backup can include the application as well as the application data.

In operation 460, backup server backup application 310 can trigger post-backup actions to the backup application 225 on virtual machine 250 for the backup that was performed in operation 450. A post-backup action could include truncating certain logs for the application, releasing the write lock on the application data, or booting the application, if the application was stopped to perform the backup.

In operation 465, virtual machine backup application 225 can execute the post-backup action(s) triggered by the backup server backup application 310 in operation 460.

In operation 470, the virtual machine backup application 225 can indicate to the backup server backup application 310 that the post-backup action(s) are complete and the backup process is complete.

Figure 7:
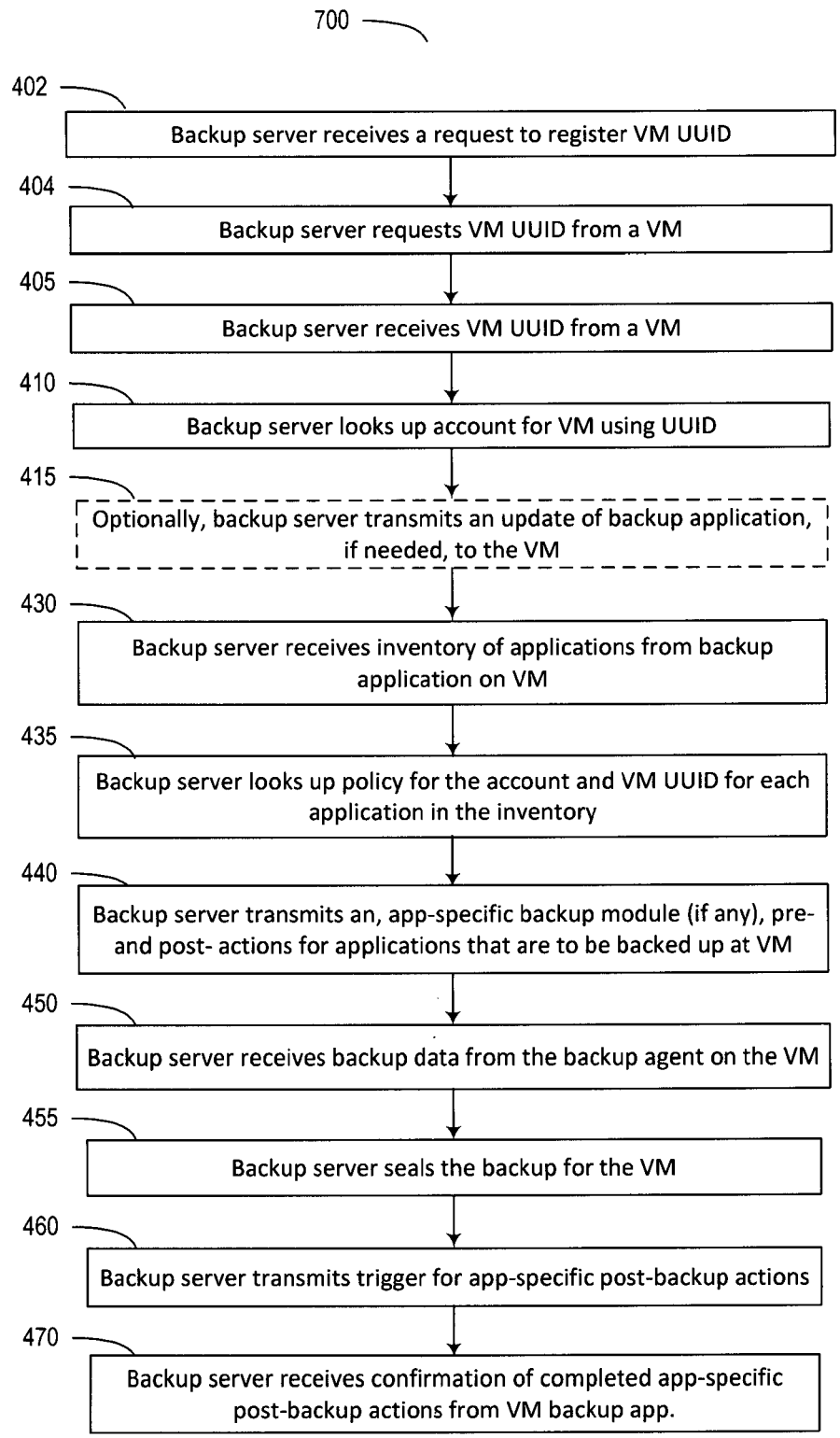
FIG. 7 illustrates a flow chart of a method of backing up a virtual machine according to some embodiments.

FIG. 7 illustrates a flow chart of a method 700 of backing up of application data of one or more applications on a virtual machine 250 to a backup server 300 using a backup application 225 on the virtual machine 250 and a backup application 310 on the backup server 310, according to some embodiments.

In operation 402, a backup server 300 can receive a request from a virtual machine having a universally unique identifier (UUID) with the backup server. The backup server can register the virtual machine 250 and UUID on the backup server 300. Registration can include associating the virtual machine 250 and UUID with an account 320 on the backup server. The account 320 can further associate the virtual machine with one or more policies 330 for backing up application data on the virtual machine 250.

In operation 405, a backup server 300 can receive the universally unique identifier (UUID) of the virtual machine 250 to uniquely identify the virtual machine 250 to the backup server 300. In an embodiment, virtual machine 250 can also transmit version information of backup application 225, or one or more backup components 270, currently on virtual machine 250. Backup server backup application 310 can use this version information to determine whether to deploy an update of the backup application 225 or one or more backup components 270 to the virtual machine 250 before proceeding with the backup.

In operation 410, backup server backup application 310 can look up the virtual machine 250 in the accounts 320 and policies 330 to determine further actions to perform during the backup. For example, an account 320 may have a policy 330 that a backup for Microsoft® Exchange Server data is to be deduplicated before storage and is to be retained for 90 days.

In operation 415, backup server backup application 310 can optionally deploy an update backup application 225, or one or more backup components 270, to the virtual machine 250, based upon the version information received from the virtual machine in operation 405.

In operation 430, virtual machine backup application 225 can transmit the inventory to the backup server backup application 310.

In operation 435, the backup server backup application 310 can look up a policy 330 for each application in the inventory and automatically associate the policy 330 with the application. In an embodiment, backup server backup application 310 can trim the inventory list based on whether a policy 330 exists for this virtual machine (e.g. by virtual of being associated with an account 320) or whether the application data should be ignored (i.e., not backed up). Once a list of applications whose data is to be backed up is determined by the backup server backup application 310, backup server backup application 310 can also look up any application-specific modules and pre- or post-backup actions that may be associated with an application whose data is to be backed up.

In operation 440, backup server backup application 310 can transmit to the virtual machine backup application 225 any application specific modules or agents 340 and any pre- or post-backup actions that are associated with an application whose data is to be backed up.

In operation 450, virtual machine backup application 225 can perform a backup of data for one or more applications. In an embodiment, the backup can be an incremental backup. In an embodiment, the backup can be a full backup of the application data. In an embodiment, the backup can be an image backup of the application data. In an embodiment, the backup can also include the application, as well as the application data. In an embodiment, backup application 225 communicates with one or more backup components 270 within the virtual machine 250, such as backup agent 275, or application-specific backup components 271, 272, or 273 to execute the backup.

In operation 455, backup server backup application 310 can seal the backup indicating that the data is safely backed up.

In operation 460, backup server backup application 310 can trigger post-backup actions for the backup that was just sealed. A post-backup action could include truncating certain logs for the application, releasing the write lock on the application data, or booting the application, if the application was stopped to perform the backups.

In operation 470, the backup server backup application 310 can receive confirmation from the virtual machine backup application 225 indicating that the post-backup action(s) are complete and the backup process is complete.

Figure 8:
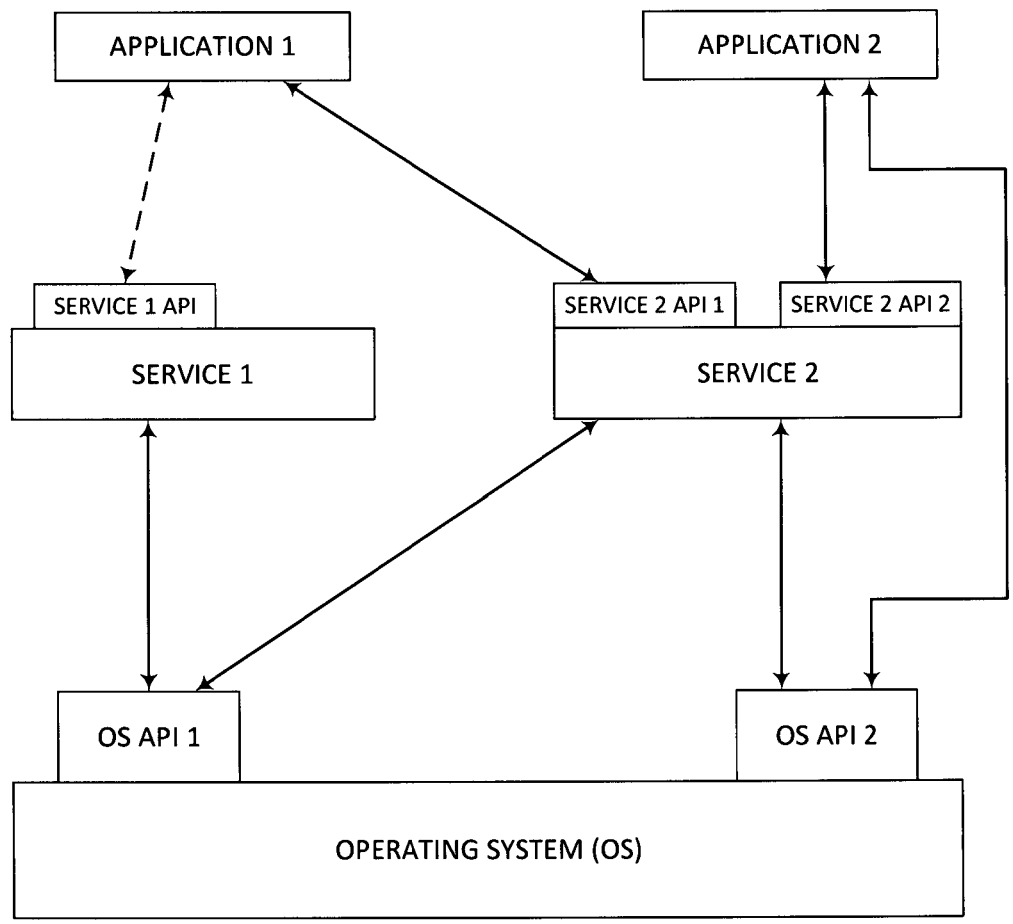
FIG. 8 illustrates an exemplary embodiment of a software stack usable in some embodiments of the invention.

In FIG. 8 ("Software Stack"), an exemplary embodiment, applications can make calls to Services A or B using several Service APIs and to Operating System (OS) using several as APIs, A and B can make calls to as using several as APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
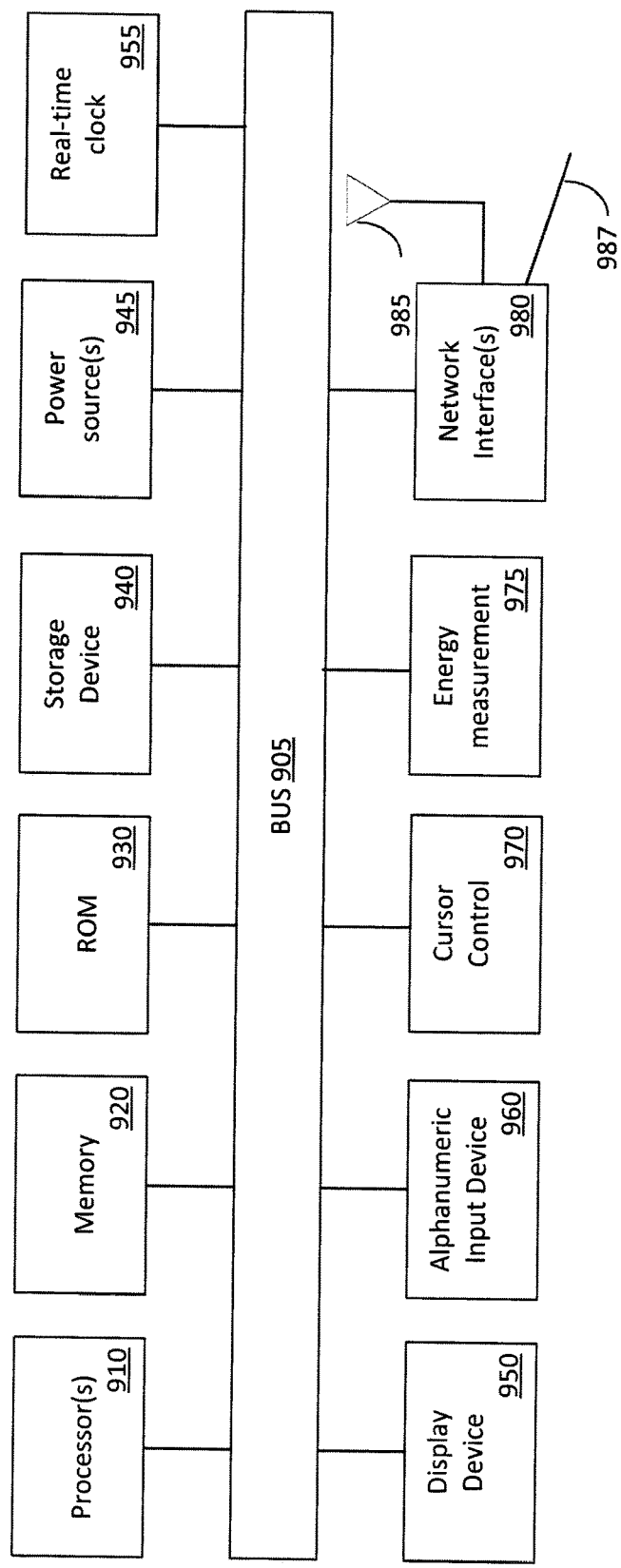
FIG. 9 illustrates, in block diagram form, an exemplary computing system for implementing concepts described herein.

FIG. 9 is a block diagram of one embodiment of a computing system 900. The computing system illustrated in FIG. 9 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 9 may be used to provide a computing device and/or a server device.

Computing system 900 includes bus 905 or other communication device to communicate information, and processor 910 coupled to bus 905 that may process information.

While computing system 900 is illustrated with a single processor, computing system 900 may include multiple processors and/or co-processors 910. Computing system 900 further may include random access memory (RAM) or other dynamic storage device 920 (referred to as main memory), coupled to bus 905 and may store information and instructions that may be executed by processor(s) 910. Main memory 920 may also be used to store temporary variables or other intermediate information during execution of instructions by processor 910.

Computing system 900 may also include read only memory (ROM) and/or other static storage device 940 coupled to bus 905 that may store static information and instructions for processor(s) 910. Data storage device 940 may be coupled to bus 905 to store information and instructions. Data storage device 940 such as flash memory or a magnetic disk or optical disc and corresponding drive may be coupled to computing system 900.

Computing system 900 may also be coupled via bus 905 to display device 950, such as a cathode ray tube (CRT) or liquid crystal display (LCD), to display information to a user. Computing system 900 can also include an alphanumeric input device 960, including alphanumeric and other keys, which may be coupled to bus 905 to communicate information and command selections to processor(s) 910. Another type of user input device is cursor control 970, such as a touchpad, a mouse, a trackball, or cursor direction keys to communicate direction information and command selections to processor(s) 910 and to control cursor movement on display 950. Computing system 900 may further include a real-time clock 955. The real-time clock 955 may be used for generating date/time stamps for data records, computing elapsed time, and other time-keeping functions. A real-time clock 955 can be a battery-backed chipset with a settable date and time. Alternatively, a real-time clock 955 may include logic to retrieve a real-time from a network source such as a server or an Internet server via network interfaces 980, described below.

Computing system 900 further may include one or more network interface(s) 980 to provide access to a network, such as a local area network. Network interface(s) 980 may include, for example, a wireless network interface having antenna 985, which may represent one or more antenna(e). Computing system 900 can include multiple wireless network interfaces such as a combination of WiFi, Bluetooth® and cellular telephony interfaces. Network interface(s) 980 may also include, for example, a wired network interface to communicate with remote devices via network cable 987, which may be, for example, an Ethernet cable, a coaxial cable, a fiber optic cable, a serial cable, or a parallel cable.

In one embodiment, network interface(s) 980 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 980 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method for performing an automated backup of application data of a plurality of applications installed on a virtual machine, the method comprising:

transmitting a universally unique identifier (UUID) of a virtual machine to a backup server;

receiving, by the virtual machine, a backup agent and installing the backup agent in the virtual machine;

in response to receiving a request to backup application data of a plurality of applications on the virtual machine, discovering by the backup agent within the virtual machine, a plurality of candidate applications currently installed in a guest operating system on the virtual machine having application data to be backed up, and generating a list of the plurality of candidate applications discovered on the virtual machine having application data to be backed up;

transmitting, to the backup server, the list of the plurality of candidate applications currently installed on the virtual machine;

in response to the transmitting, receiving, from the backup server, a list of applications installed on the virtual machine whose application data is to be backed up, wherein the list of applications is a subset of the list of the plurality of candidate applications, and the list of applications whose application data is to be backed up is based on a policy associated with the UUID that specifies a plurality of applications whose application data is to be backed up for the virtual machine having the UUID, and receiving an application-specific pre-backup action and an application-specific post-backup action for at least one application in the list of applications installed on the virtual machine whose application data is to be backed up; automatically performing the application-specific pre-backup action for the at least one application, before backing up the application data of the at least one application;

performing, using the backup agent in the virtual machine, the backup of the application data of the applications in the list of applications whose application data is to be backed up, received from the backup server; and automatically performing the application-specific post-backup action after backing up the application data of the at least one application.

2. The method of claim 1, wherein the list of applications whose application data is to be backed up further includes a type of backup to be performed, based on the policy, for each application in the list of applications whose application data is to be backed up, wherein a type of backup comprises one of incremental backup, full back, image backup, or an interleaved combination of any of these.

3. The method of claim 1, further comprising:
receiving an application-specific backup module for the at least one application.

4. The method of claim 1, wherein the backup comprises an application-specific image backup.

5. The method of claim 1, further comprising:
transmitting confirmation of performance of the application-specific pre-backup action, in response to performing the pre-backup action; and
transmitting confirmation of performance of the application-specific post-backup action, in response to performing the post-backup action.

6. The method of claim 1, wherein receiving the backup agent is in response to receiving a request to perform a backup of the virtual machine from one of:
a remote administration terminal;
a user of the virtual machine; or
an automatically generated request by the backup server.

7. The method of claim 1, wherein the backup agent runs within the virtual machine.

8. The method of claim 7, wherein the backup agent runs on the guest operating system of the virtual machine.

9. A non-transitory computer readable medium programmed with instructions that, when executed by a processing system having at least one hardware processor, perform operations for an automated backup of application data of a plurality of applications installed on a virtual machine, the operations comprising:
transmitting a universally unique identifier (UUID) of a virtual machine to a backup server;
in response to the transmitting, receiving, by the virtual machine, a backup agent and installing the backup agent in the virtual machine;
in response to receiving a request to backup application data of a plurality of applications on the virtual machine, discovering by the backup agent within the virtual machine a plurality of candidate applications currently installed in a guest operating system on the virtual machine having application data to be backed up, and generating a list of the plurality of candidate applications discovered on the virtual machine having application data to be backed up;
transmitting, to the backup server, the list of the plurality of candidate applications currently installed on the virtual machine;
receiving, from the backup server, a list of applications installed on the virtual machine whose application data is to be backed up, wherein the list of applications is a subset of the list of the plurality of candidate applications, and the list of applications whose application data is to be backed up is based on a policy associated with the UUID that specifies a plurality of applications whose application data is to be backed up for the virtual machine having the UUID, and receiving an application-specific pre-backup action and an application-specific post-backup action for at least one application in the list of applications installed on the virtual machine whose application data is to be backed up;
automatically performing the application-specific pre-backup action for the at least one application, before backing up the application data of the at least one application;
performing, using the backup agent in the virtual machine, the backup of the application data of the applications in the list of applications whose application data is to be backed up, received from the backup server; and
automatically performing the application-specific post-backup action after backing up the application data of the at least one application.

10. The medium of claim 9, wherein the list of applications whose application data is to be backed up received from the backup server further includes a type of backup to be performed, based on the policy, for each application in the list of applications to be backed up, wherein a type of backup comprises one of incremental backup, full back, image backup, or an interleaved combination of any of these.

11. The medium of claim 9, further comprising:
receiving an application-specific backup module for the at least one application.

12. The medium of claim 9, wherein the backup comprises an application-specific image backup.

13. The medium of claim 9, further comprising:
transmitting confirmation of performance of the application-specific pre-backup action, in response to performing the pre-backup action; and
transmitting confirmation of performance of the application-specific post-backup action, in response to performing the post-backup action.

14. The medium of claim 9, wherein receiving the backup agent is in response to receiving a request to perform a backup of the virtual machine from one of:
a remote administration terminal;
a user of the virtual machine; or
an automatically generated request by the backup server.

15. The medium of claim 9, wherein the backup agent runs within the virtual machine.

16. The medium of claim 15, wherein the backup agent runs on the guest operating system of the virtual machine.

17. A system comprising a processing system having at least one hardware processor, the processing system coupled to a memory programmed with executable instructions that, when executed by the processing system perform operations for an automated backup of application data of a plurality of applications installed on a virtual machine, the operations comprising:

transmitting a universally unique identifier (UUID) of a virtual machine to a backup server;

in response to the transmitting, receiving, by the virtual machine, a backup agent and installing the backup agent in the virtual machine;

in response to receiving a request to backup application data of a plurality of applications on the virtual machine, discovering by the backup agent within the virtual machine a plurality of candidate applications currently installed in a guest operating system on the virtual machine having application data to be backed up, and generating a list of the candidate applications discovered on the virtual machine having application data to be backed up;

transmitting, to the backup server, the list of the plurality of candidate applications currently installed on the virtual machine having data to be backed up to the backup server;

receiving, from the backup server, a list of applications installed on the virtual machine whose application data is to be backed up, wherein the list of applications is a subset of the list of the plurality of candidate applications, and the list of applications whose application data is to be backed up is based on a policy associated with the UUID that specifies a plurality of applications whose application data is to be backed up for the virtual machine having the UUID, and receiving an application-specific pre-backup action and an application-specific post-backup action for at least one application in the list of applications installed on the virtual machine whose application data is to be backed up;

automatically performing the application-specific pre-backup action for the at least one application, before backing up the application data of the at least one application;

performing, using the backup agent in the virtual machine, the backup of the application data of the applications in the list of applications whose application data is to be backed up, received from the backup server; and automatically performing the application-specific post-backup action after backing up the application data of the at least one application.

18. The system of claim 17, wherein the list of applications whose application data is to be backed up, received from the backup server, further includes a type of backup to be performed, based on the policy, for each application in the list of applications whose application data is to be backed up, wherein a type of backup comprises one of incremental backup, full back, image backup, or an interleaved combination of any of these.

19. The system of claim 17, further comprising:
receiving an application-specific backup module for the at least one application.

20. The system of claim 17, wherein the backup comprises an application-specific image backup.

21. The system of claim 17, further comprising:
transmitting confirmation of performance of the application-specific pre-backup action, in response to performing the pre-backup action; and transmitting confirmation of performance of the application-specific post-backup action, in response to performing the post-backup action.

22. The system of claim 17, wherein receiving the backup agent is in response to receiving a request to perform a backup of the virtual machine from one of:
a remote administration terminal;
a user of the virtual machine; or
an automatically generated request by the backup server.

23. The system of claim 17, wherein the backup agent runs within the virtual machine.

24. The system of claim 23, wherein the backup agent runs on the guest operating system of the virtual machine.

* * * * *